United States Patent [19]

Alverio et al.

[11] Patent Number: 5,038,642
[45] Date of Patent: Aug. 13, 1991

[54] METHOD OF MAKING DRILL WITH WEAR INSERTS

[75] Inventors: John Alverio, Shelby Township; John S. Agapiou, Warren, both of Mich.

[73] Assignee: General Motors Corporation, Detroit, Mich.

[21] Appl. No.: 659,778

[22] Filed: Feb. 25, 1991

[51] Int. Cl.⁵ .............................. B21K 5/04
[52] U.S. Cl. .................... 76/108.6; 76/DIG. 11; 76/DIG. 12; 408/145; 408/230
[58] Field of Search ...... 76/108.1, DIG. 11, DIG. 12, 76/108.6, 101.1; 408/144, 145, 230

[56] References Cited

U.S. PATENT DOCUMENTS 1,847,302  3/1932  Emmons ........................ 76/108.6
2,832,238  4/1958  Brinker et al. ................. 76/108.1
4,679,971  7/1987  Maier ............................ 408/145

FOREIGN PATENT DOCUMENTS 0148826  10/1931  Switzerland ................... 76/108.1

Primary Examiner—Roscoe V. Parker
Attorney, Agent, or Firm—Patrick M. Griffin

[57] ABSTRACT

The brazing seams that attach cutting edge wear inserts on a drill are protected against wear and erosion. The inserts are deliberately differentially sized so that the points where the brazing seams that attach them intersect the cutting edges are differentially spaced from the drill center line. Then, a notch is cut into each cutting edge just wide and deep enough to prevent the brazing seam from contacting the cut. Cutting is still complete, despite the notches, since they do not overlap.

1 Claim, 1 Drawing Sheet

METHOD OF MAKING DRILL WITH WEAR INSERTS

This invention relates to drills in general, and specifically to an improved method of producing a drill with wear resistant cutting edge inserts Background of the Invention The cutting edges of one type of standard drill are produced by the intersection of axially extending flutes with the conical head of the cylindrical body of the drill. The straight cutting edges so created run from the apex of the conical head to the cylindrical side wall of the drill body, creating an obtuse angled corner. In some cutting applications, it is desired to give the cutting edges more wear resistance than the material of the drill body alone could provide. Since it is the outboard portion of the cutting edges that moves at the highest cutting speed, and therefore sees the most potential wear, it is often enough to enhance just that outboard portion, creating what may be referred to as an inserted drill. This is typically done by machining a pocket with an arcuate back edge into the face of the flute, across the corner An insert of more wear resistant material is cut to basically the same size as the pocket, with an arcuate back edge of substantially the same radius and curvature. When attached into the pocket, an edge of the insert will be aligned with what remains of the original cutting edge, becoming part of it, in effect.

The insert is typically attached to the drill body by a brazing process. In the brazing process, a piece of brazing material cut from a thin sheet to approximately the same shape as the pocket is placed in the pocket and liquefied by melting it with a torch. Then, the insert is delicately laid into the pocket on top of the melted layer of brazing material by an operator working with a tweezer like tool. The insert in effect floats on the melted layer as it is carefully manipulated until its outer straight edge is aligned with the cutting edge of the drill body. As a practical matter, it is not possible to machine the pocket and insert arcuate edges closely enough that they can be pushed hard against one another with no gap therebetween. As a result, the operator is obliged to hold a semi annular gap between the two arcuate edges as the insert is maneuvered. It is difficult to maintain that gap, since there is no positive stop to work against, and because the operator has to worry about aligning of the rest on the insert, as well. Consequently, brazing material inevitably is squeezed into and hardens in the gap between the arcuate edges, creating a semi annular seam, one end of which intersects the cutting edge. The brazing material is much softer than either the drill material or the insert, and is therefore subject to wear and erosion from the workpiece as the drill cuts.

SUMMARY OF THE INVENTION

The invention provides a method of producing such a drill that avoids the brazing seam erosion problem while maintaining the cutting effectiveness of the drill.

According to the method of the invention, pockets of the same arcuate shape are machined into the faces of the flutes, across the corners. However, the pockets differ in size, so that the first pocket intersects the cutting edge at a first distance from drill center, and the second at a differing distance. When the insert is brazed in place, the operator need only hold the width of the gap between the arcuate edges to a reasonable width, but need not hold it to an absolute minimum. When the brazing seams have hardened, a notch is cut into each of the cutting edges that is centered over the end of the brazing seam. The width of the notch is equal to or slightly greater than the width of the brazing seam, so as to remove all of the brazing material where it would otherwise engage a workpiece during cutting. But the width of each notch is less than the differential between the two pockets. Therefore, there will be no point where the two notches radially overlap as the drill cuts, so that there is complete cutting contact of the cutting edges with the workpiece. In addition, a particular angular orientation for each notch is given that minimizes drag.

It is, therefore, a general object of the invention to provide a method of manufacturing an inserted drill in which erosion of the brazing seam that attaches the inserts is avoided.

It is another object of the invention to provide such a method in which the width of the brazing seam between the arcuate edges of the insert and pocket need not be held to an absolute minimum.

It is another object of the invention to eliminate erosion by cutting clearance notches in the cutting edges that remove the brazing seam at the point where it would otherwise engage a workpiece, while assuring that the notches have no cutting overlap.

It is another object of the invention to provide an orientation of the notches that minimizes drag as the drill cuts.

DESCRIPTION OF THE PREFERRED EMBODIMENT

These and other objects and features of the invention will appear from the following written description, and from the drawings, in which.

Figure 1:
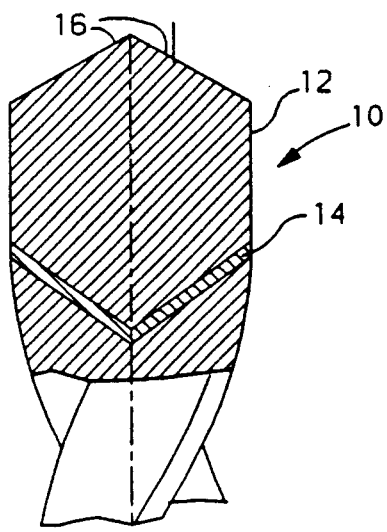
FIG. 1 is a view of a prior art drill in which the entire conical head is a different material.

Referring first to FIG. 1, one prior art approach to providing enhanced drill wear resistance is illustrated. A drill 10 has its entire conical head 12 provided by a harder material, which is attached by a continuous conical layer or seam of brazing material 14. Seam 14 does not intersect any part of the cutting edges 16 of drill 10, and is not, therefore, subject to the type of wear and erosion described above. However, it is expensive to make the entire conical head 12 out of wear resistant material.

Figure 2:
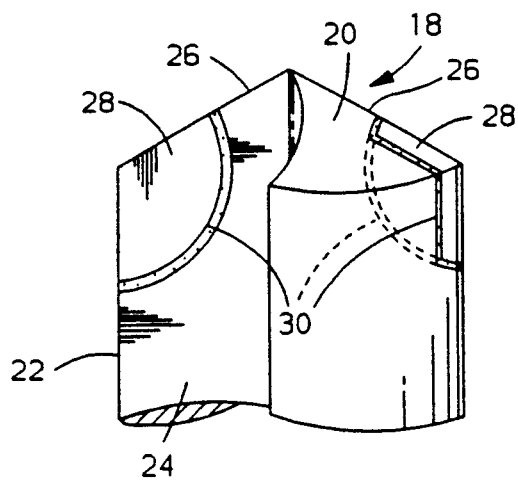
FIG. 2 is a view of an inserted type drill made by a conventional process.

Referring to FIG. 2, the conventional type of inserted drill described above is illustrated. A cylindrical drill body 18 has a conical head 20 and a cylindrical side wall 22 that is interrupted by a pair of straight, axially running flat faced flutes 24. Where the flutes 24 intersect the conical head 20, a pair of straight cutting edges 26 are created, each of which runs radially out and axially down from the apex of head 20. The side wall 22 and each cutting edge 26 together form a corner on the face of each flute 24, with an obtuse angle of about 120 degrees. The outboard portion of each cutting edge 26 is wear enhanced by attaching a hardened insert 28 of diamond or other hard material across the corner of flute 24. Insert 28 is attached by the method described above, which leaves an attachment seam 30 intersecting cutting edge 26 and subject to erosion. The method of manufacture, described next, resolves the seam erosion problem.

Figure 3:
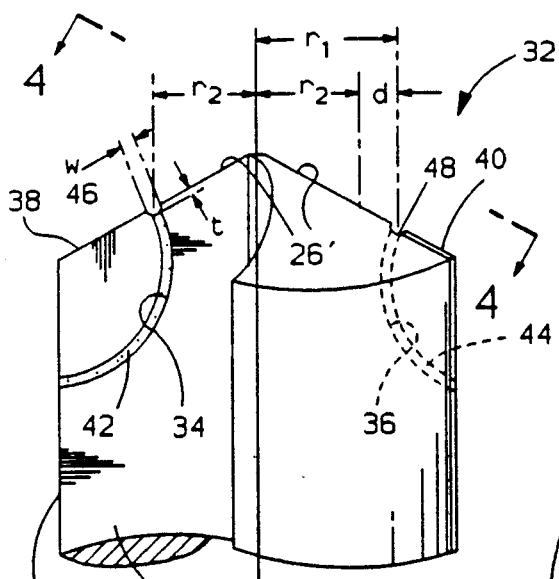
FIG. 3 is a view of a preferred embodiment of an inserted drill made according to the process of the invention.

Referring next to FIG. 3, a drill 32 produced according to..the method of the invention starts with the same basic drill body, and equivalent parts are given the same number primed. The first step, as with the conventional process, is to machine pockets across the corners of the faces of the flutes 24'. However, there is a deliberate differential in pocket size. A first pocket 34 is deliberately larger than a second pocket 36, although they are of similar shape, with arcuate back edges. As a consequence of the size differential, the smaller second pocket 36 removes less of the face of its flute 24', and intersects its cutting edge 26, at a point $r_1$ farther from the center axis of drill 32 than does the larger first pocket 34, shown as $r_2$. The differential between $r_1$ and $r_2$ is indicated at "d". A pair of inserts 38 and 40 of conventional material and shape, but sized specifically to the pockets 34 and 36 respectively, are cut and attached by the same method described above. Two semi annular attachment seams of brazing material 42 and 44 result. While the width of the seams 42 and 44 can easily be held at less than the differential d, the operator need not work to absolutely minimize the width of seams 42 and 44, because of the additional step described next.

Figure 4:
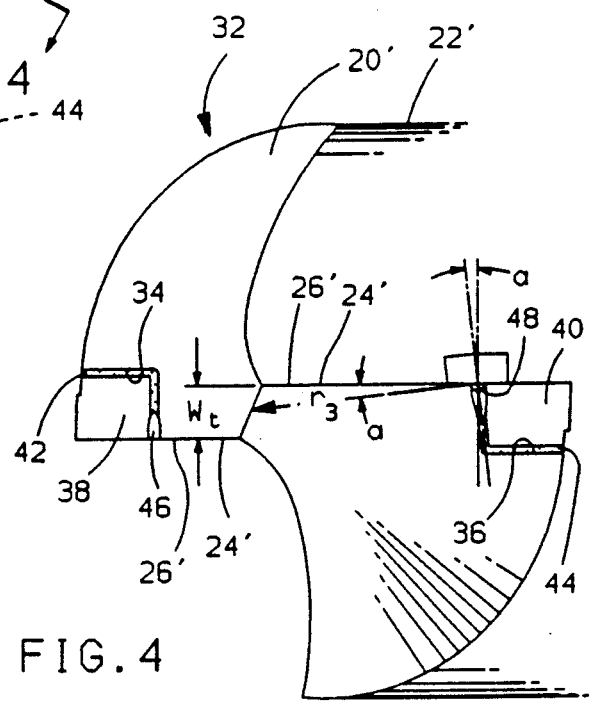
FIG. 4 is a view taken from the plane indicated by the line 4—4 in FIG. 3.

Referring next to FIGS. 3 and 4, the last step in the process is a notching operation that serves to eliminate or at least substantially reduce the seam erosion problem, without jeopardizing drilling effectiveness. A notch 46 and 48 is cut into each cutting edge 26' at a point that is basically centered over the end of each attachment seam 42 and 44. Each notch 46 and 48 has a width at least as great as the seams 42 and 44, and perhaps a little wider, so that some drill material and some insert material may be ground out as well. Each notch 46 and 48 has a width w that is less than the differential d, so that there is no radial overlap therebetween a measured from the center axis of drill 32. Each notch 46 and 48 also has a depth t that is at least as great as the depth of cut planned for drill 32, and is rounded in cross section so as to avoid stress concentration. The depth and width of the notches 46 and 48 assures that no brazing material in the seams 42 and 44 will contact the workpiece as drill 32 cuts, and will not be subject to wear and erosion. The differential d assures that there will be no overlap between the notches 46 and 48 as drill 32 cuts, so that some part of the two cutting edges 26, will make complete cutting contact with the workpiece for every revolution.

Referring next to FIG. 4, a specific advantageous orientation for the length of each notch is given, illustrated particularly for notch 48. The distance $W_t$, known as the web thickness, is the thickness of the material left in the conical head 20' after the flutes 24, have been ground, as measured across the point of the conical head 20, The vector $r_3$ runs from the center axis of drill 32 to the point where notch 48 intersects with its cutting edge 26', and represents a line which is perpendicular to the cutting velocity of the edge 26, at that point. In order to assure that the length of notch 48 is, in effect, also perpendicular to the cutting velocity at that point, it is oriented with a specific angle a, as measured relative to a line perpendicular to cutting edge 26, The angle a is calculated as arcs in $[W_t/(2 \times r_3)]$. This orientation gives minimal drag of the notch 48 as the drill 32 operates.

Variations of the embodiment disclosed could be made. Some drill bodies have helical flutes, rather than straight, but the faces of such flutes thereof could be inserted in similar fashion Drills with more than two flutes, and thus more than two cutting edges, could be inserted in the same way, so long as there was no overlap between the notches so as to assure complete cutting. Therefore, it will be understood that it is not intended to limit the invention to just the embodiment disclosed.

The embodiments of the invention in which an exclusive property or privilege is claimed are defined as follows:

1. A method of providing enhanced wear resistance to a cylindrical drill body of the type having a conical head and a pair of axially extending flute faces flutes that create a pair of straight cutting edges at the intersection of said flute faces and conical head, said cutting edges each running from an apex of said conical head to a corner at the side wall of said drill body, said method comprising the steps of;

machining a first pocket across the corner of the face of one of said flutes and intersecting its cutting edge at a first distance from the center of said drill body, machining a second pocket across the corner of the face of the other of said flutes and intersecting its cutting edge at a second distance from the center of said drill body different than said first distance, providing a wear resistant insert substantially size matched to each of said pockets, attaching said inserts into said pockets with a layer of liquid material that hardens to create an attachment seam intersecting said cutting edges substantially at said first and second distances from the center of said drill body, and, grinding a notch into each of said cutting edges and inserts substantially at the points of intersection with said seams and of a width at least equal to said attachment seam but less than the difference between said first and second distances, whereby said attachment material is prevented from wearing during cutting by said drill while said cutting edges make complete cutting contact during drilling by virtue of the limited width of said notches.

* * * * *